(12) United States Patent
Robbins (10) Patent No.: US 8,873,548 B1
(45) Date of Patent: Oct. 28, 2014

(54) METHOD AND SYSTEM FOR PROVIDING CALL-FORWARDING STATUS INDICATIONS IN A PACKET-SWITCHED NETWORK

(75) Inventor: David C Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 631 days.

(21) Appl. No.: 11/534,353

(22) Filed: Sep. 22, 2006

Related U.S. Application Data (60) Provisional application No. 60/719,465, filed on Sep. 22, 2005.

(51) Int. Cl.
H04L 12/66 (2006.01)

(52) U.S. Cl.
USPC ............... 370/356; 379/88.12; 379/100.06

(58) Field of Classification Search
USPC ............ 379/100.06, 201.01, 211.02, 88.12, 379/211; 370/352, 356, 420, 421, 428, 485
See application file for complete search history.

(56) References Cited

U.S. PATENT DOCUMENTS

| | | | |
|---|---|---|---|
| 3,737,587 A | 6/1973 | Romero | |
| 4,154,987 A | 5/1979 | Rosenberg et al. | |
| 4,528,424 A | 7/1985 | Middleton et al. | |
| 4,723,271 A | 2/1988 | Grundtisch | |
| 4,741,024 A | 4/1988 | Del Monte et al. | |
| 4,950,011 A | 8/1990 | Borcea et al. | |
| 5,165,095 A | 11/1992 | Borcherding | |
| 5,323,444 A | 6/1994 | Ertz et al. | |
| 5,471,519 A | 11/1995 | Howe et al. | |
| 5,475,745 A | 12/1995 | Boyle | |
| 5,619,561 A | 4/1997 | Reese | |
| 5,815,550 A | 9/1998 | Miller | |
| 5,835,570 A | 11/1998 | Wattenbarger | |
| 5,913,166 A | 6/1999 | Buttitta et al. | |
| 5,970,134 A | 10/1999 | Highland et al. | |
| 5,999,610 A | 12/1999 | Lin et al. | |
| 6,021,176 A | 2/2000 | McKendry et al. | |
| 6,026,156 A | 2/2000 | Epler et al. | |
| 6,031,896 A | 2/2000 | Gardell et al. | |
| 6,072,865 A * | 6/2000 | Haber et al. | 379/211.02 |
| 6,208,726 B1 | 3/2001 | Bansal et al. | |
| 6,219,414 B1 | 4/2001 | Maciejewski et al. | |
| 6,337,898 B1 | 1/2002 | Gordon | |
| 6,339,639 B1 | 1/2002 | Henderson | |
| 6,404,876 B1 | 6/2002 | Smith et al. | |
| 6,484,196 B1 | 11/2002 | Maurille | |
| 6,510,315 B1 | 1/2003 | Arnson | |
| 6,636,594 B1 | 10/2003 | Oran | |
| 6,735,295 B1 | 5/2004 | Brennan et al. | |
| 6,741,695 B1 | 5/2004 | McConnell et al. | |
| 6,744,877 B1 | 6/2004 | Edwards | |

(Continued)

OTHER PUBLICATIONS www.carrollcommunications.com/ipoffice/5donotdisturb.html, p. 1 of 2.

(Continued)

*Primary Examiner* — Duc Nguyen
*Assistant Examiner* — Yosef K Laekemariam (57) ABSTRACT

Preferred embodiments of the invention provide systems and methods subscribing to receive a call forwarding status notification associated with a call forwarding service, receiving a call forwarding status notification when a state associated with the call forwarding service changes, and interpreting the call forwarding status notification.

14 Claims, 6 Drawing Sheets

(56) References Cited

U.S. PATENT DOCUMENTS

| | | | |
|---|---|---|---|
| 6,754,325 B1* | 6/2004 | Silver et al. | 379/211.02 |
| 6,801,604 B2 | 10/2004 | Maes et al. | |
| 6,807,259 B1 | 10/2004 | Patel et al. | |
| 6,826,174 B1 | 11/2004 | Erekson et al. | |
| 6,834,048 B1 | 12/2004 | Cho et al. | |
| 6,856,616 B1 | 2/2005 | Schuster et al. | |
| 6,857,072 B1 | 2/2005 | Schuster et al. | |
| 6,870,830 B1 | 3/2005 | Schuster et al. | |
| 6,876,632 B1 | 4/2005 | Takeda | |
| 6,879,673 B2 | 4/2005 | Creamer et al. | |
| 6,954,521 B2 | 10/2005 | Bull et al. | |
| 6,954,524 B2 | 10/2005 | Gibson | |
| 6,961,332 B1 | 11/2005 | Li et al. | |
| 6,963,633 B1 | 11/2005 | Diede et al. | |
| 6,965,614 B1 | 11/2005 | Osterhout et al. | |
| 6,985,961 B1 | 1/2006 | Ramsayer et al. | |
| 6,996,605 B2 | 2/2006 | Low et al. | |
| 7,020,130 B2 | 3/2006 | Krause et al. | |
| 7,031,700 B1 | 4/2006 | Weaver et al. | |
| 7,039,710 B2 | 5/2006 | Khartabil | |
| 7,050,559 B2 | 5/2006 | Silver et al. | |
| 7,082,193 B2 | 7/2006 | Barclay et al. | |
| 7,085,253 B2* | 8/2006 | Yang | 370/338 |
| 7,130,282 B2 | 10/2006 | Black | |
| 7,145,997 B2 | 12/2006 | Poikselka et al. | |
| 7,203,293 B1 | 4/2007 | Bedingfield | |
| 7,224,792 B2 | 5/2007 | Fusco | |
| 7,257,837 B2 | 8/2007 | Xu et al. | |
| 7,260,201 B2* | 8/2007 | Jorasch et al. | 379/207.04 |
| 7,274,662 B1 | 9/2007 | Kalmane et al. | |
| 7,283,517 B2 | 10/2007 | Yan et al. | |
| 7,290,288 B2 | 10/2007 | Gregg et al. | |
| 7,295,577 B2 | 11/2007 | Moody et al. | |
| 7,301,913 B2 | 11/2007 | Corrao et al. | |
| 7,406,696 B2 | 7/2008 | Burger et al. | |
| 7,426,265 B2 | 9/2008 | Chen et al. | |
| 7,440,440 B1 | 10/2008 | Abichandani et al. | |
| 7,460,657 B1* | 12/2008 | Baeza | 379/211.02 |
| 7,489,771 B2 | 2/2009 | McMurry et al. | |
| 7,564,846 B2 | 7/2009 | Dezonno et al. | |
| 7,580,497 B2 | 8/2009 | Wang et al. | |
| 7,587,031 B1 | 9/2009 | Ress et al. | |
| 7,593,389 B2 | 9/2009 | Vance | |
| 7,599,355 B2 | 10/2009 | Sunstrum | |
| 7,602,901 B1 | 10/2009 | Kates et al. | |
| 7,609,700 B1 | 10/2009 | Ying et al. | |
| 7,609,706 B2 | 10/2009 | Scott et al. | |
| 7,630,481 B2 | 12/2009 | Kafka | |
| 7,715,413 B2 | 5/2010 | Vaziri et al. | |
| 7,743,141 B2 | 6/2010 | Wang et al. | |
| 7,773,581 B2 | 8/2010 | Punj et al. | |
| 7,813,490 B2 | 10/2010 | DeMent et al. | |
| 7,849,205 B2 | 12/2010 | Pounds et al. | |
| 7,860,089 B2 | 12/2010 | Tripathi et al. | |
| 8,036,360 B1 | 10/2011 | Gogineni et al. | |
| 8,059,805 B2 | 11/2011 | Claudatos et al. | |
| 8,116,302 B1 | 2/2012 | Robbins | |
| 8,379,824 B2 | 2/2013 | Jackson et al. | |
| 2002/0038388 A1 | 3/2002 | Netter | |
| 2002/0114318 A1 | 8/2002 | Rines | |
| 2002/0131447 A1 | 9/2002 | Krishnamurthy et al. | |
| 2002/0136359 A1 | 9/2002 | Stumer et al. | |
| 2002/0136363 A1 | 9/2002 | Stumer et al. | |
| 2002/0137495 A1 | 9/2002 | Gabrysch | |
| 2002/0141548 A1 | 10/2002 | Boda | |
| 2002/0156900 A1 | 10/2002 | Marquette et al. | |
| 2003/0007483 A1 | 1/2003 | Um | |
| 2003/0028806 A1 | 2/2003 | Govindarajan et al. | |
| 2003/0043992 A1 | 3/2003 | Wengrovitz | |
| 2003/0088421 A1 | 5/2003 | Maes et al. | |
| 2003/0231759 A1 | 12/2003 | Bedingfield, Sr. et al. | |
| 2004/0030750 A1 | 2/2004 | Moore et al. | |
| 2004/0037403 A1 | 2/2004 | Koch | |
| 2004/0051900 A1 | 3/2004 | Sagiya et al. | |
| 2004/0082324 A1 | 4/2004 | Ayoub | |
| 2004/0090954 A1 | 5/2004 | Zhang et al. | |
| 2004/0148395 A1 | 7/2004 | Schulzrinne | |
| 2004/0174983 A1 | 9/2004 | Olschwang et al. | |
| 2004/0207724 A1 | 10/2004 | Crouch et al. | |
| 2004/0240656 A1 | 12/2004 | Poustchi | |
| 2004/0243680 A1 | 12/2004 | Mayer | |
| 2004/0249951 A1 | 12/2004 | Grabelsky et al. | |
| 2004/0264406 A1 | 12/2004 | Pattenden et al. | |
| 2005/0013421 A1* | 1/2005 | Chavez et al. | 379/93.09 |
| 2005/0043014 A1 | 2/2005 | Hodge | |
| 2005/0069104 A1 | 3/2005 | Hanson et al. | |
| 2005/0078642 A1 | 4/2005 | Mayer et al. | |
| 2005/0123104 A1 | 6/2005 | Bishop et al. | |
| 2005/0129219 A1 | 6/2005 | Williamson | |
| 2005/0147227 A1 | 7/2005 | Chervirala et al. | |
| 2005/0190721 A1* | 9/2005 | Pershan | 370/328 |
| 2005/0193338 A1 | 9/2005 | Hawkins et al. | |
| 2005/0195802 A1 | 9/2005 | Klein et al. | |
| 2005/0201530 A1 | 9/2005 | Koch et al. | |
| 2005/0213716 A1 | 9/2005 | Zhu et al. | |
| 2005/0215243 A1* | 9/2005 | Black et al. | 455/417 |
| 2005/0226217 A1 | 10/2005 | Logemann et al. | |
| 2005/0237978 A1 | 10/2005 | Segal | |
| 2005/0249196 A1 | 11/2005 | Ansari et al. | |
| 2005/0286466 A1 | 12/2005 | Tagg et al. | |
| 2006/0023658 A1 | 2/2006 | Phillips et al. | |
| 2006/0033809 A1 | 2/2006 | Farley | |
| 2006/0039389 A1 | 2/2006 | Burger et al. | |
| 2006/0050648 A1 | 3/2006 | Eydelman | |
| 2006/0050682 A1 | 3/2006 | Vance | |
| 2006/0062210 A1 | 3/2006 | Dharanikota | |
| 2006/0062251 A1 | 3/2006 | Lim et al. | |
| 2006/0067300 A1 | 3/2006 | Poustchi et al. | |
| 2006/0067504 A1 | 3/2006 | Goldman et al. | |
| 2006/0140379 A1 | 6/2006 | Yamamoto et al. | |
| 2006/0140380 A1 | 6/2006 | Croak et al. | |
| 2006/0146737 A1 | 7/2006 | Sandgren et al. | |
| 2006/0153342 A1 | 7/2006 | Sasaki | |
| 2006/0165060 A1 | 7/2006 | Dua | |
| 2006/0177030 A1 | 8/2006 | Rajagopalan et al. | |
| 2006/0177044 A1 | 8/2006 | O'Neil et al. | |
| 2006/0178130 A1 | 8/2006 | Makrygiannis | |
| 2006/0203986 A1* | 9/2006 | Gibson | 379/211.02 |
| 2006/0218283 A1 | 9/2006 | Jones | |
| 2006/0221176 A1 | 10/2006 | Di Pietro et al. | |
| 2006/0251229 A1 | 11/2006 | Gorti et al. | |
| 2006/0285533 A1 | 12/2006 | Divine et al. | |
| 2006/0286984 A1 | 12/2006 | Bonner | |
| 2007/0025270 A1 | 2/2007 | Sylvain | |
| 2007/0058613 A1 | 3/2007 | Beckemeyer | |
| 2007/0083658 A1 | 4/2007 | Hanna et al. | |
| 2007/0092073 A1 | 4/2007 | Olshansky et al. | |
| 2007/0111723 A1 | 5/2007 | Ahmed et al. | |
| 2007/0143858 A1 | 6/2007 | Hearty | |
| 2007/0147601 A1 | 6/2007 | Tischer et al. | |
| 2007/0280469 A1 | 12/2007 | Baker et al. | |
| 2008/0049724 A1 | 2/2008 | Tsujino et al. | |
| 2008/0126549 A1 | 5/2008 | Khanchandani et al. | |

OTHER PUBLICATIONS www.cisco.com/en/U/s/products/sw/voicesw/ps556/products_administration_guide, pp. 3-5 of 26.

Rosenberg et al. "RFC 3261, SIP: Session Initiation Protocol", The Internet Society, Jun. 2002.

Newton's Telecom Dictionary 22nd Edition, p. 829, Feb. 2006.

Sparks, "RFC 3515—The Session Initiation Protocol (SIP) Refer Method," The Internet Society, Apr. 2003.

Mahy et al., "RFC 3891—The Session Initiation Protocol (SIP) 'Replaces' Header," The Internet Society, Sep. 2004.

Mahy et al, "RFC 3911—The Session Initiation Protocol (SIP) 'Join' Header," The Internet Society, Oct. 2004.

Handley et al., "RFC 2327—SDP: Session Description Protocol," The Internet Society, Apr. 1998.

Schulzrinne et al., "RFC 1889—RTP: A Transport Protocol for Real-Time Applications." The Internet Society, Jan. 1996.

Schulzrinne et al., "RFC 2833—RTP Payload for DTMF Digits, Telephony Tones and Telephony Signals," The Internet Society, May 2000.

(56) References Cited

OTHER PUBLICATIONS

Mahy et al., "draft-ietf-sip-join-03—The Session Initiation Protocol (SIP) "Join" Header," The Internet Society, Feb. 2004.

Mahy et al., "draft-ietf-sipping-cc-framework-03—A Call Control and Multi-party usage framework for the Session Initiation Protocol (SIP)," The Internet Society, Oct. 27, 2003.

Rosenberg, "RFC 3311—The Session Initiation Protocol (SIP) UPDATE Method," The Internet Society, Sep. 2002.

Rosenberg et al., "RFC 3262—Reliability of Provisional Responses in the Session Initiation Protocol (SIP)," The Internet Society, Jun. 2002.

Jennings et al., "RFC 3325—Private Extensions to the Session Initiation Protocol (SIP) for Asserted Identity within Trusted Networks," The Internet Society, Nov. 2002.

Harrington et al., "RFC 3411—An Architecture for Describing Simple Network Management Protocol (SNMP) Management Frameworks," The Internet Society, Dec. 2002.

Rosenberg et al., "RFC 3840—Indicating User Agent Capabilities in the Session Initiation Protocol (SIP )," The Internet Society, Aug. 2004.

Mahy, "RFC 3842—A Message Summary and Message Waiting Indication Event Package for the Session Initiation Protocol (SIP)," The Internet Society, Aug. 2004.

"SR-504: SPCS Capabilities and Features," Telcordia Technologies, Issue 1, Mar. 1996.

"SR-3065: LSSGR Guide," Telcordia Technologies, Issue 7, Aug. 2003.

Mahy et al. "draft-ietf-sip-replaces-05—The Session Initiation Protocol (SIP) "Replaces" Header," The Internet Society, Feb. 16, 2004.

Schulzrinne, "draft-ietf-sipping-sos-00—Emergency Services URI for the Session Initiation Protocol," The Internet Society, Feb. 8, 2004.

Rosenberg et al., "draft-ietf-sipping-dialog-package-04—An INVITE Inititiated Dialog Event Package for the Session Initiation Protocol (SIP)," The Internet Society, Feb. 13, 2004.

Lingle et al., "draft-ietf-sip-mib-08—Management Information Base for Session Initiation Protocol (SIP)," The Internet Society, Jul. 16, 2004.

Johnston et al., "draft-ietf-sipping-cc-conferencing-04—Session Initiation Protocol Call Control—Conferencing for User Agents," The Internet Society, Jul. 18, 2004.

Sparks et al., "draft-ietf-sipping-cc-transfer-02—Session Initiation Protocol Call Control—Transfer," The Internet Society, Feb. 15, 2004.

Rosenberg et al., "draft-ietf-sipping-conference-package-04—A Session Initiation Protocol (SIP) Event Package for Conference State," The Internet Society, May 21, 2004.

Petrie, "draft-ietf-sipping-config-framework-04—A Framework for Session Initiation Protocol User Agent Profile Delivery," The Internet Society.

"GR-1298-CORE—AINGR: Switching Systems," Telcordia Technologies, Issue 6, Nov. 2000.

"Cisco CallManager Features and Services Guide, Release 4.1(3)—Multilevel Precedence and Preemption," Cisco Systems, Inc., http://www.cisco.com/en/US/products/sw/voicesw/ps556/products_admin istration_guide . . . , three pages, Copyright 2005.

"IP Office, Do Not Disturb," Carroll Communications, Inc., www.carrollcommunications.com/ipoffice/5donotdisturb.html, one page, Copyright 2008.

Petrie, "A Framework for Session Initiation Protocol User Agent Profile Delivery, draft-ietf-sipping-config-framework-04.txt," Pingtel Corp., SIPPING Working Group, The Internet Society, 34 pages, Jul. 19, 2004.

\* cited by examiner

METHOD AND SYSTEM FOR PROVIDING CALL-FORWARDING STATUS INDICATIONS IN A PACKET-SWITCHED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a packet switched and/or packet-based network such as a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides call screening in packet-switched and/or packet-based networks.

Figure 1:
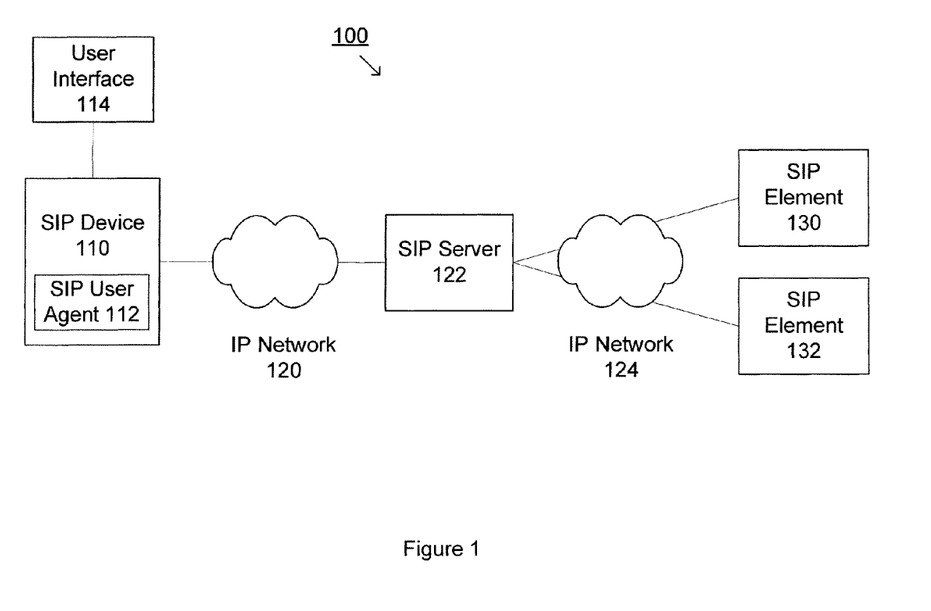
FIG. 1 illustrates an exemplary SIP-based network system, according to an embodiment of the present invention.

FIG. 1 is an exemplary SIP-based network system, according to an embodiment of the present invention. System 100 illustrates an exemplary system for supporting SIP communication, in particular providing call screening in SIP communication. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voiceband or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

Figure 2:
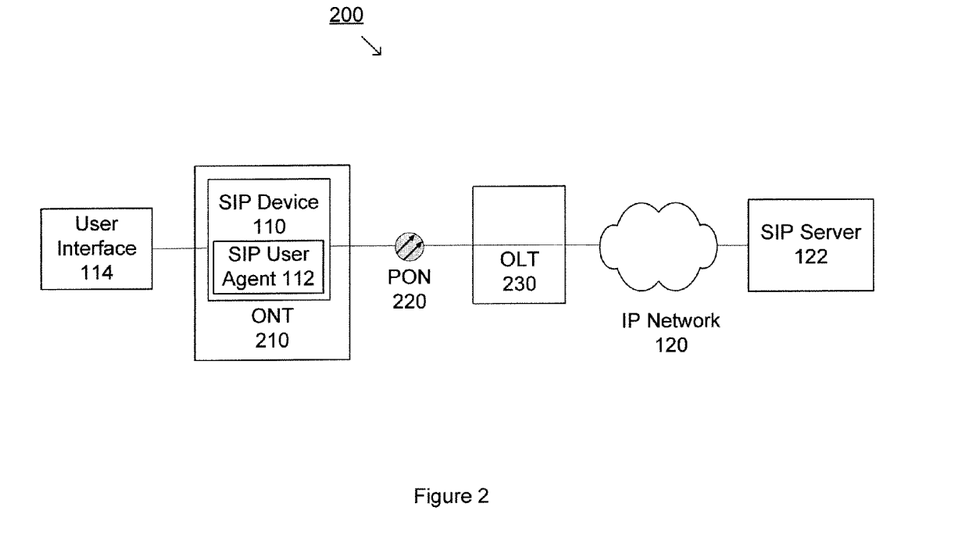
FIG. 2 illustrates an exemplary implementation where a SIP Device is embedded in a FTTP network, according to an embodiment of the present invention.
Figure 3:
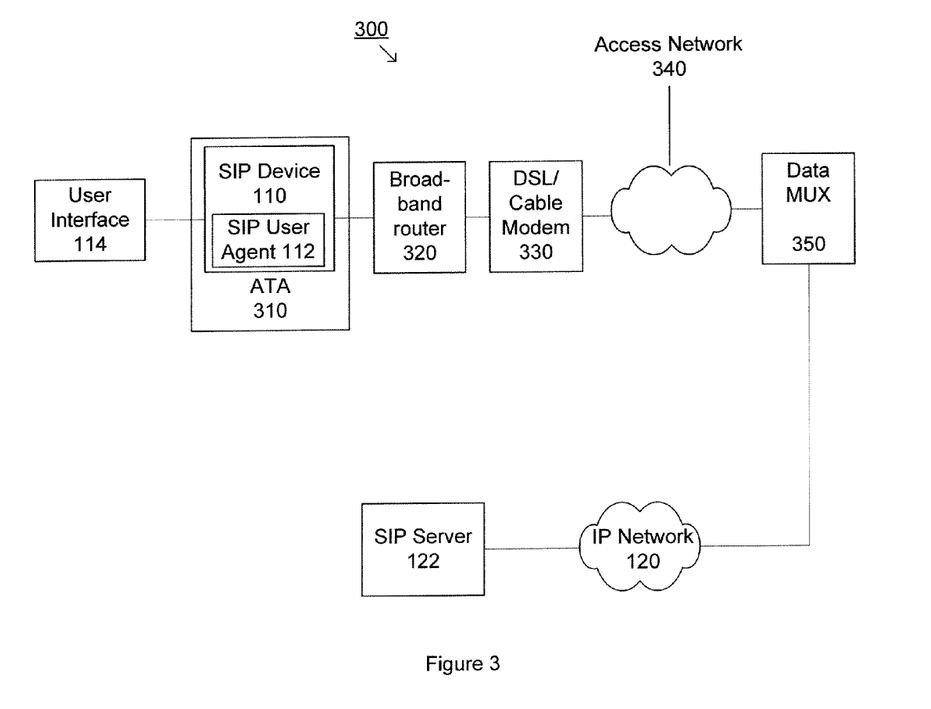
FIG. 3 illustrates an exemplary implementation where a SIP Device is embedded in an ATA device attached to a network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 with a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the IP transport network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

Figure 4:
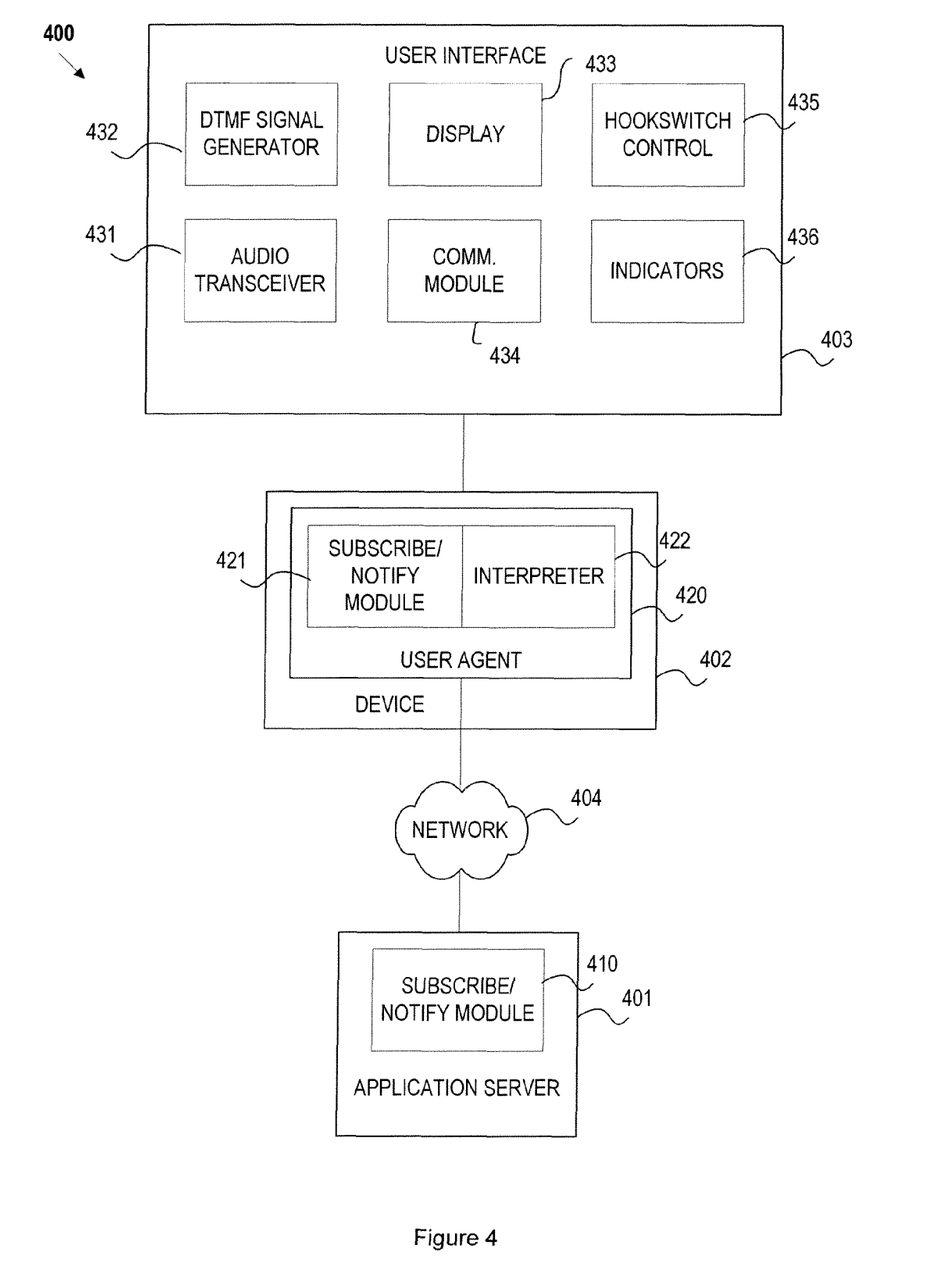
FIG. 4 illustrates an exemplary system for providing call forwarding status indications, according to an embodiment of the present invention.

FIG. 4 depicts an exemplary system 400 for providing call forwarding status indications according to various embodiments. As shown in FIG. 4, system 400 may include an application server 401, a device 402, and a user interface 403. Further, as shown in FIG. 4, application server 401 and device 402 may be coupled via a network 404. In various exemplary embodiments, network 404 may be a packet-switched and/or packed based network such as, for example, an IP network, SIP network, a VoIP network and/or the like.

Application server 401 may include network elements (not shown) that provide services to users. While application server 401 is illustrated as a single element in FIG. 4, application server 401 may be comprised of multiple elements including, but not limited to, for example, SIP registrars, location servers, proxy servers, back-to-back user agents, and/or the like. As shown in FIG. 4, application server 401 may include a subscribe/notify module 410 to receive and transmit SUBSCRIBE and NOTIFY requests as will be described in greater detail below.

According to various embodiments, device 402 may be an instrument through which an end user may connect to network 404 to send and receive calls and avail the end user of services (e.g., a collection of behaviors to be applied to communications requests on behalf of an end user) that may be provided. Device 402 may include a user agent 420. User agent 420 may include a subscriber module 421 and an interpreter 422. In an exemplary embodiment, subscriber module 421 and interpreter 422 may comprise a single module to receive and transmit SUBSCRIBE and NOTIFY requests and generate call forwarding status indications. In an exemplary embodiment, user agent 420 may be a SIP construct that represents a device in a SIP-based network, for example. In such an embodiment, user agent 420 may be coupled with a network and a user interface, as shown in FIG. 4.

User interface 403 may provide a means through which a user interacts with the user agent 420 in order to initiate and receive voice communications. In an exemplary embodiment, user interface 403 may be a telephone or like device. Also, user interface 403 may include a computer emulating a telephone, for example. As shown in FIG. 4, user interface 403 may include a dual-tone multi-frequency (DTMF) signal generator 431, an audio transceiver 432, a display 433, a communications module 434, a hookswitch control 435, and indicators 436.

In an exemplary embodiment, DTMF signal generator 431 may include twelve DTMF keys or a rotary dial similar to those on conventional telephones. In such an embodiment, a user may press the DTMF keys or move the rotary dial, respectively, to generate DTMF signals. Also, DTMF signal generator 431 may include a computer emulating twelve DTMF keys. In such an embodiment, a user may interact with the computer to generate DTMF signals.

Audio transceiver 432 may provide a means of transmitting and receiving audio signals. In an exemplary embodiment, audio transceiver may include a microphone, earphone, speaker, and/or the like.

Display 433 may display verbal and/or graphical messages to the user. For example, display 403 may display the phrase "Call Forwarding—ON" to a user to indicate that the call forwarding service is active. Similarly, display 403 may display the phrase "Call Forwarding—OFF" to indicate that the call forwarding service is inactive. Also, display 403 may serve as a caller identification display, capable of displaying the name and number associated with an incoming call.

Communications module 434 may provide a means for communicating with device 402 and/or user agent 420. Communications module 434 may include an analog telephone port, a wireless port, or any other means for coupling user interface 403 with device 402 and/or user agent 420, for example.

Hookswitch control 435 may perform the functions of a traditional hookswitch, which may include, e.g., initiating a call, terminating a call, and accessing a service within a call (e.g., the function of a "flash" button).

Indicators 436 may provide indications to the user regarding the services provided. For example, indicators 436 may provide a message waiting indicator, an indication that a service (e.g., call forwarding) is active or inactive, or the like. Indicators 436 may include indicator lights, for example, and/or graphical representations that may appear on the display.

As noted above, subscribe/notify module 410 and subscriber module 421 may receive and transmit SUBSCRIBE and NOTIFY requests. In an exemplary embodiment, the modules may receive and transmit SUBSCRIBE and NOTIFY requests in accordance with the Internet Engineering Task Force's (IETF) Request for Comment (RFC) No. 3265 entitled "SIP-Specific Event Notification," the contents of which is incorporated in its entirety. In such an embodiment, the user agent may subscribe to services for various resources or calls in the network, for example, thus enabling the user agent to receive notifications regarding the service. For example, the user agent may subscribe to a "call-forwarding-indicator" service to receive a notification when the status of the call forwarding service changes and/or a "call-redirection-reminder" service to receive a notification when a call is forwarded.

According to this exemplary SUBSCRIBE/NOTIFY capability, a subscriber may be a user agent that receives NOTIFY requests from notifiers (e.g., an application server). The NOTIFY request may contain information about the state of a resource and/or service in which the subscriber is interested. A subscriber may generate SUBSCRIBE requests and transmit the SUBSCRIBE requests to create subscriptions. A notifier may generate notification requests for the purpose of notifying subscribers of the state of a resource and/or service. A notifier may also accept SUBSCRIBE requests to create subscriptions. An event package may refer to an specification that defines a set of state information to be reported by a notifier to a subscriber.

In an exemplary embodiment, SUBSCRIBE requests may include an "Event" header and an "Accept" header, for example. In such an embodiment, the "Event" header may indicate which event or class of events to which the subscriber is subscribing. Also, the "Event" header may include a token which indicates the type of state for which a subscription is being requested. An "Accept" header may indicate the body formats allowed in subsequent NOTIFY requests.

SUBSCRIBE requests may be a dialog-creating method. For example, when a subscriber wishes to subscribe to a particular service, the subscriber may form and transmit a SUBSCRIBE message. This SUBSCRIBE request may then be confirmed with a final response in the foist of a NOTIFY request, for example.

In an exemplary embodiment, NOTIFY requests and/or messages may be sent to inform subscribers of changes in state to which the subscriber has a subscription. In such an embodiment, a NOTIFY may not terminate the corresponding subscription. NOTIFY requests may contain "Event" headers that may contain an event package name for which a notification is being generated, for example. The "Event" package name may correspond to the "Event" header in the corresponding SUBSCRIBE message. NOTIFY requests may also contain "Content-Type" headers which may indicate a body format, and may also contain bodies that may contain the state of the subscribed resource and/or service.

Various exemplary embodiments provide status indications associated with a call forwarding service. In these embodiments, the status indications and/or call forwarding service may be managed by an application server, for example. Also, the status indications may be provided to the user via a user agent, for example.

In various exemplary embodiments, a status indication may provide for the rendering of the current state (e.g., active or inactive) of the call forwarding service to the user. In various exemplary embodiments, this rendering may be provided as, for example, a "stutter dial tone." Also, this rendering may be provided via an indicator associated with the call forwarding service.

Figure 5:
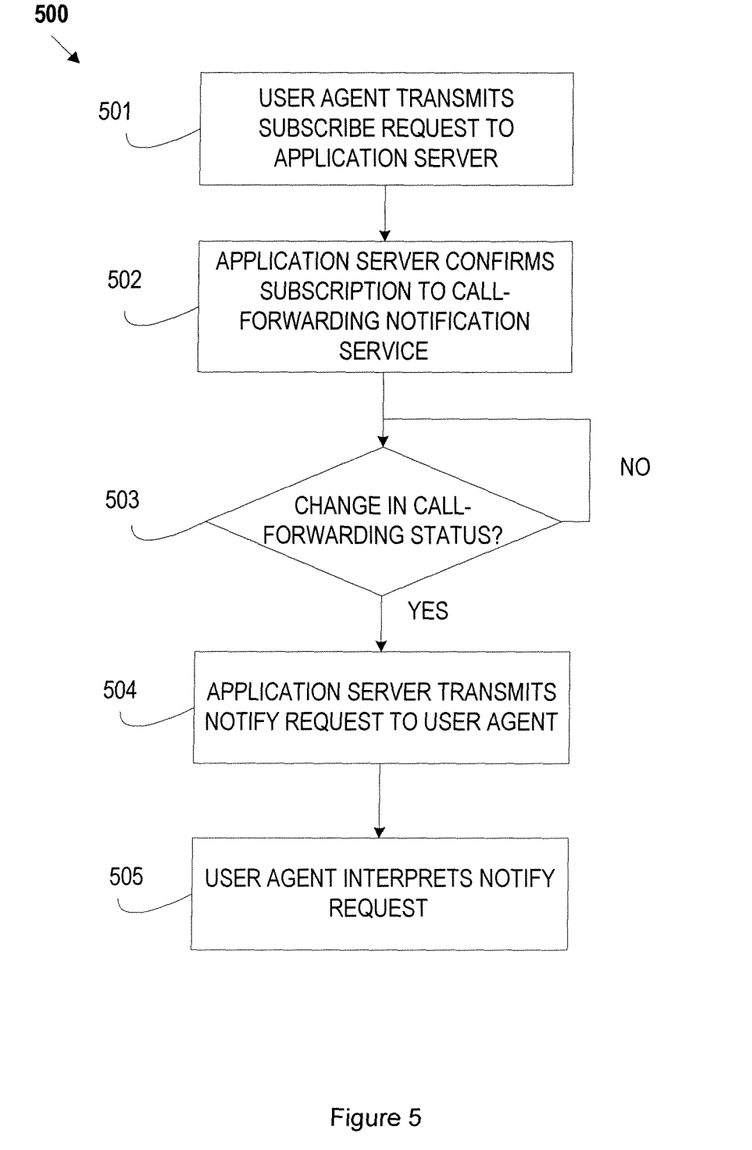
FIG. 5 illustrates an exemplary method for providing call forwarding status indications, according to an embodiment of the present invention.

FIG. 5 depicts flow chart 500 which illustrates an exemplary method for rendering the current state of the call forwarding service according to an embodiment of the invention. In such an embodiment, a user agent may be configured to render to the user via the interface, for example, the current state of the call forwarding service such as, whether call forwarding is active or inactive.

In block 501, a user agent may transmit a SUBSCRIBE request to an application server. Such a SUBSCRIBE request may subscribe the user agent to the call-forwarding notification service. In an exemplary embodiment, as is described above, the SUBSCRIBE request may include an "Event" header field and an "Accept" header field. In such an embodiment, the "Event" header field may specify the value "ua-profile," and the "Accept" header field may specify the value "application/server-call-feature status+xml."

In block 502, the application server may confirm the subscription by the user agent to the call-forwarding notification service. In an exemplary embodiment, the application server may transmit a NOTIFY request to the user agent. In such an embodiment, the NOTIFY request may include an "Event" header field having a value "ua-profile" and a Content-Type header field having a value "application/server-call-feature-status+xml." Also, the content of the NOTIFY request may have the following format:

```
<ua-profile>
<feature>call-forwarding-indicator</feature>
<status>status</status>
</ua-profile>
``` where "status" is either "on" or "off."

In block 503, the application server may determine whether there has been a change in the call forwarding status. For example, the application server may determine whether the call forwarding status changes from "on" to "off" and/or whether the call-forwarding status changes from "off" to "on." If there is a change in status, the application server may transmit a NOTIFY request to the user agent in block 504 in a similar manner as described above for block 503. If there is not a change in status, the application server may continue to await a change in status.

In block 505, the user agent may interpret the NOTIFY request. In an exemplary embodiment, the user agent may interpret the NOTIFY request to generate a notification to the user via the user interface, for example, that the call forwarding status has changed. For example, where the call forwarding status changes from "off" to "on" the user interface may notify the user via a stutter-dial tone and/or the activation of an indicator, such as a light. Also, whether the user interface includes a display screen or the like, the user interface may notify the user by presenting, for example, a verbal message and/or graphical representation to the user or the display screen. Where the call forwarding status changes from "on" to "off," the user interface may notify the user via a return to a normal dial tone and/or the deactivation of the indicator, verbal message and/or graphical representation on a display screen.

In various exemplary embodiments, a further status indication may provide for the notification of the forwarded call to the user. In these embodiments, this notification may be provided as, for example, a "splash ring."

Figure 6:
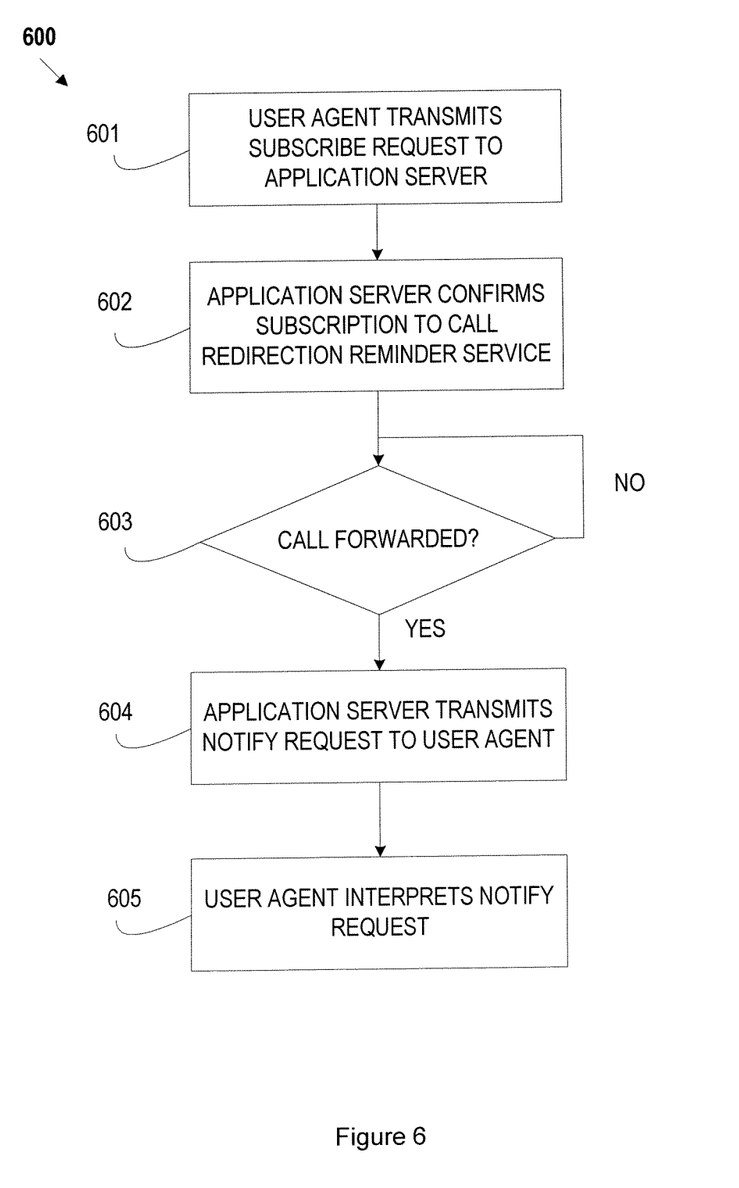
FIG. 6 illustrates an exemplary method for providing call forwarding status indications, according to an embodiment of the present invention.

FIG. 6 depicts flow chart 600 which illustrates an exemplary method for notifying a user that a call has been forwarded. In an exemplary embodiment, a user agent may be configured to render to the user via, for example, a user interface, a notification that a call has been forwarded.

In block 601, a user agent may transmit a SUBSCRIBE request to an application server. Such a SUBSCRIBE request may subscribe the user agent to a call redirection reminder service. In an exemplary embodiment, as described above, the SUBSCRIBE request may include an "Event" header field and an "Accept" header field. In such an embodiment, the "Event" header field may specify the value "network-redirection-reminder" and the "Accept" header field may specify the value "application/network-redirection."

In block 602, the application server may confirm the subscription by the user agent to the call redirection reminder service. In an exemplary embodiment, the application server may transmit a NOTIFY request to the user agent. In such an embodiment, the notify request may include an "Event" header that may specify a value "network-redirection-reminder."

In block 603, the application server may determine whether call has been forwarded. If there is a change in status, the application server may transmit a NOTIFY request to the user agent in block 604. If a call has not been forwarded, the application server may continue to await a forwarded call.

In block 604, when a call is forwarded, for example, the application server may notify the user agent that a call has been forwarded. In an exemplary embodiment, the application server may transmit a NOTIFY request to the user agent. In such an embodiment, the NOTIFY request may include an "Event" header field having a value "network-redirectionreminder" and a "Content-Type" header field whose value is "application/network-redirection:" Also, the NOTIFY request may include content of a single line containing "call redirected," for example.

In block 605, the user agent may interpret the NOTIFY request. In an exemplary embodiment, the user agent may interpret the NOTIFY request to generate a notification to the user via the user interface, for example, that a call has been forwarded. For example, the user interface may generate what is commonly referred to as a "splash ring" (e.g., a single 500 millisecond burst of power ringing) to notify the user that a call has been forwarded.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
sending a first subscription message over a packet-switched network, using Session Initiation Protocol (SIP) event notification, to receive a call forwarding status notification associated with a call forwarding service of a user when a state associated with the call forwarding service changes;
receiving a call forwarding status notification when a state associated with the call forwarding service changes;
sending a second subscription message over the packet-switched network, using Session Initiation Protocol (SIP) event notification, to receive a call redirection notification associated with the call forwarding service of the user when a call has been forwarded; and
interpreting the call forwarding status notification at a device locally coupled to a user interface of the user, wherein the device is capable of notifying the user when the call has been forwarded; wherein the first subscription message comprises a first field identifying the call forwarding service and a second field defining the format of the call forwarding status notification.

2. The method according to claim 1, wherein the packet-switched network comprises an Internet Protocol (IP) network.

3. The method according to claim 2, wherein the IP network implements Session Initiation Protocol (SIP), the subscribe request is a SIP SUBSCRIBE message, and the call forwarding status notification is a SIP NOTIFY message.

4. The method according to claim 1, wherein the receiving comprises receiving a notify request from a server in the packet-switched network, the notify request indicating the state associated with call forwarding service.

5. The message according to claim 4, wherein the notify request comprises a first field identifying the call forwarding service.

6. A method, comprising:
receiving a first subscription message over a packet-switched network, using Session Initiation Protocol (SIP) event notification, to provide a call forwarding status notification associated with a call forwarding service of a user;
determining a change in a state associated with the call forwarding service;
providing a call forwarding status notification to a device locally coupled to a user interface of the user when the state associated with the call forwarding service changes;
receiving a second subscription message over a packet-switched network, using Session Initiation Protocol (SIP) event notification, to provide a call redirection notification associated with the call forwarding service of the user when a call has been forwarded; and
providing the call redirection notification to the device locally coupled to a user interface of the user when the call has been forwarded, wherein the device is capable of notifying the user when the call has been forwarded; wherein the first subscription message comprises a first field identifying the call forwarding service and a second field defining the format of the call forwarding status notification.

7. The method according to claim 6, wherein the packet-switched network comprises an Internet Protocol (IP) network.

8. The method according to claim 7, wherein the IP network implements Session Initiation Protocol (SIP), the subscription is a SIP SUBSCRIBE message, and the call forwarding status notification is a SIP NOTIFY message.

9. The method according to claim 6, wherein the providing comprises providing a notify request from a server in the packet-switched network, the notify request indicating the state associated with call forwarding service.

10. The method according to claim 9, wherein the notify request comprises a first field identifying the call forwarding service.

11. A system comprising:
a subscriber module, using Session Initiation Protocol (SIP) event notification, to subscribe to and receive a call forwarding status notification associated with a call forwarding service of a user and to subscribe to and receive a call redirection notification associated with the call forwarding service of the user and the subscriber module transmits a subscribe message over a packet switched network, the subscribe message comprising a first field identifying the call forwarding service and a second field defining the format of the call forwarding status notification; and
an interpreter module at a device locally coupled to a user interface of the user to interpret the received call forwarding status notification and to interpret the received call redirection notification, wherein the device is capable of notifying the user when a call has been forwarded.

12. The system according to claim 11, wherein the subscriber module receives a notify request from a server in the packet-switched network, the notify request indicating a state associated with call forwarding service.

13. A system, comprising:
a subscribe module, using Session Initiation Protocol (SIP) event notification, to receive a subscription to provide a call forwarding status notification associated with a call forwarding service of a user and to receive a subscription to provide a forwarded call notification for one or more calls forwarded for the user and the subscribe module receives a subscribe message over a packet-switched network, the subscribe message comprising a first field identifying the call forwarding service and a second field defining the format of the call forwarding status notification;
a notify module to determine a change in a state associated with the call forwarding service and provide a call forwarding status notification to a device locally coupled to a user interface of the user when the state associated with the call forwarding service changes and to identify a forwarded call and provide a call redirection notification to the device when a call associated with the call forwarding service is forwarded, wherein the device is capable of notifying the user when the call has been forwarded.

14. The system according to claim 13, wherein the notify module transmits a notify request from a server in the packet-switched network, the notify request indicating a state associated with call forwarding service.

\* \* \* \* \*